Jan. 14, 1941.                L. J. HARRISS ET AL                2,228,516
                              PIE RIMMING MACHINE
                    Original Filed Sept. 17, 1938    10 Sheets-Sheet 1

Inventors
Lloyd J. Harriss
Bernard Lambers
By Williams, Bradbury,
McCaleb & Hinkle
Attys.

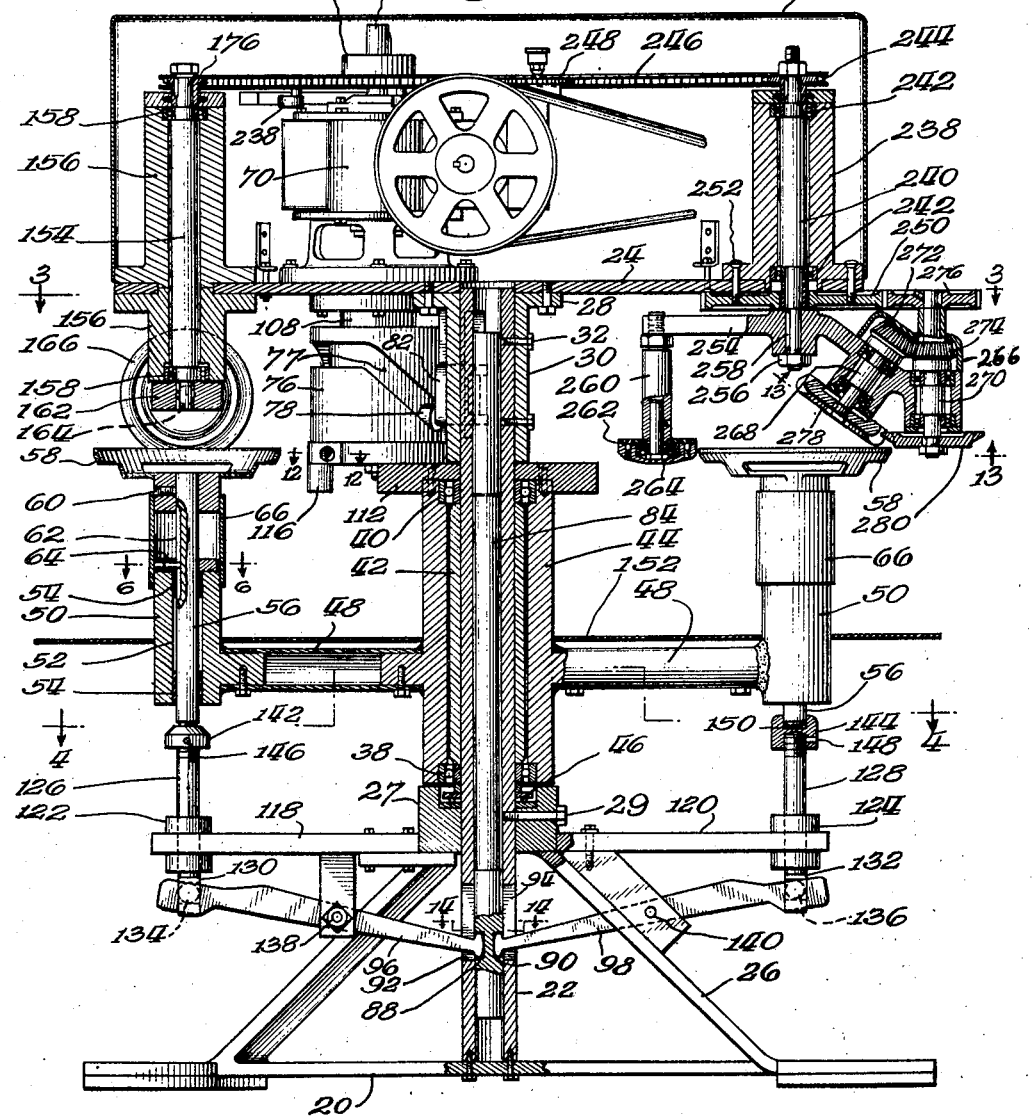

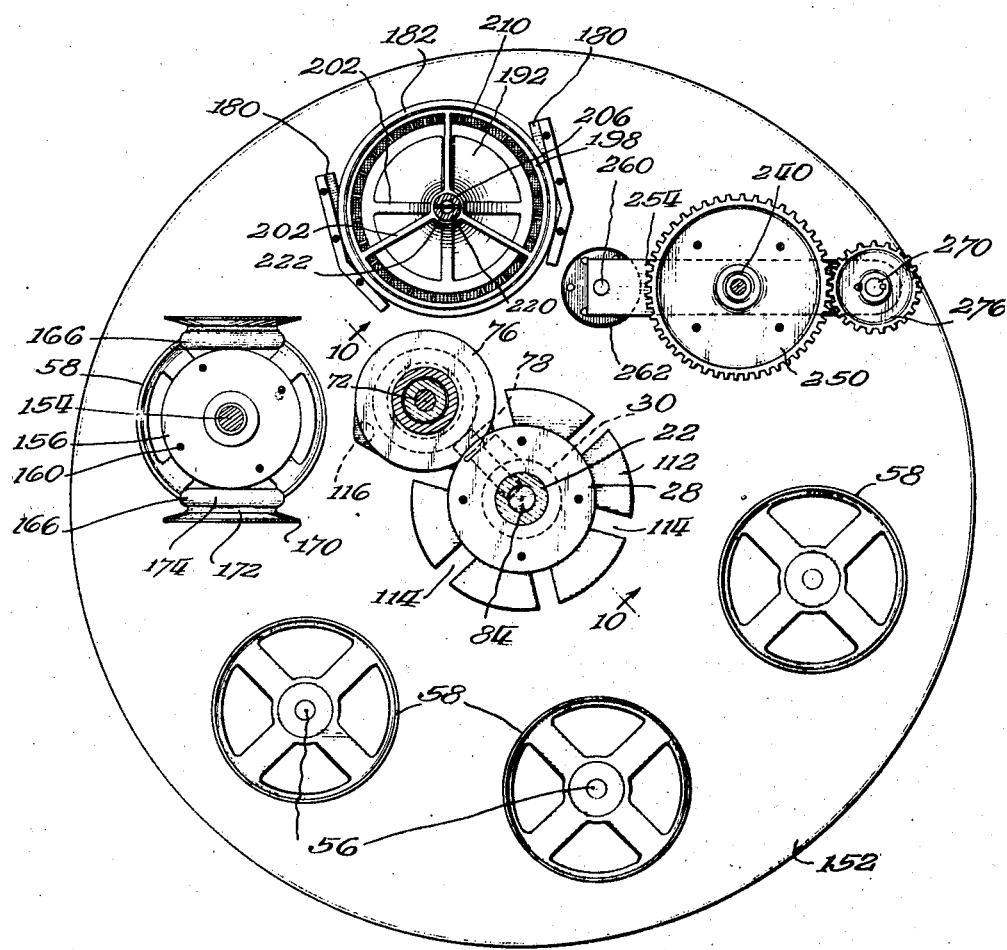
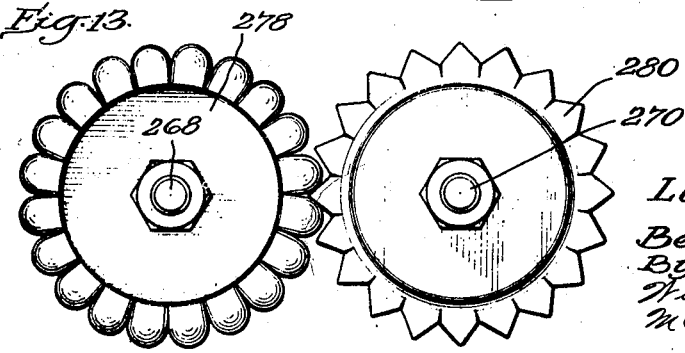

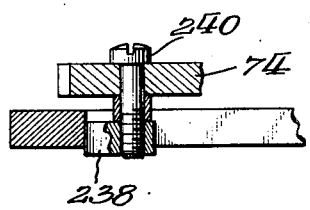
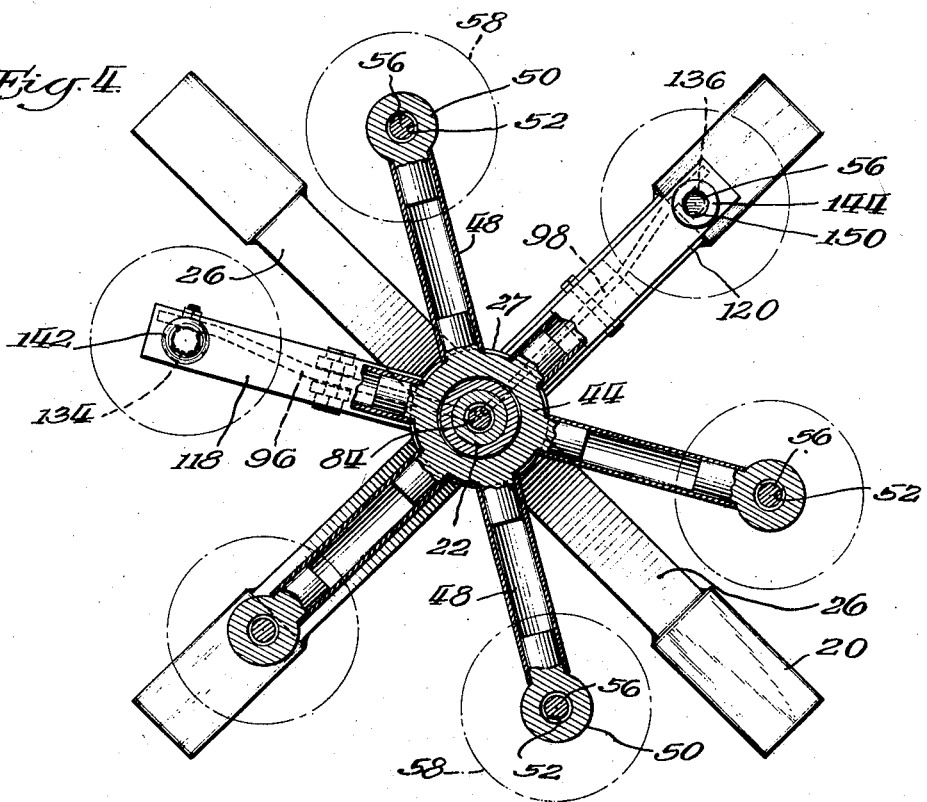
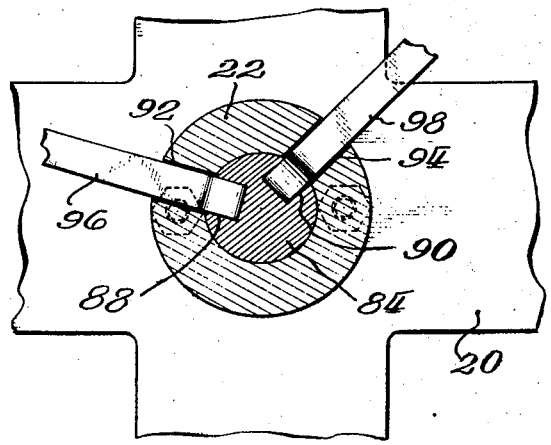

Jan. 14, 1941.   L. J. HARRISS ET AL   2,228,516
PIE RIMMING MACHINE
Original Filed Sept. 17, 1938   10 Sheets-Sheet 5
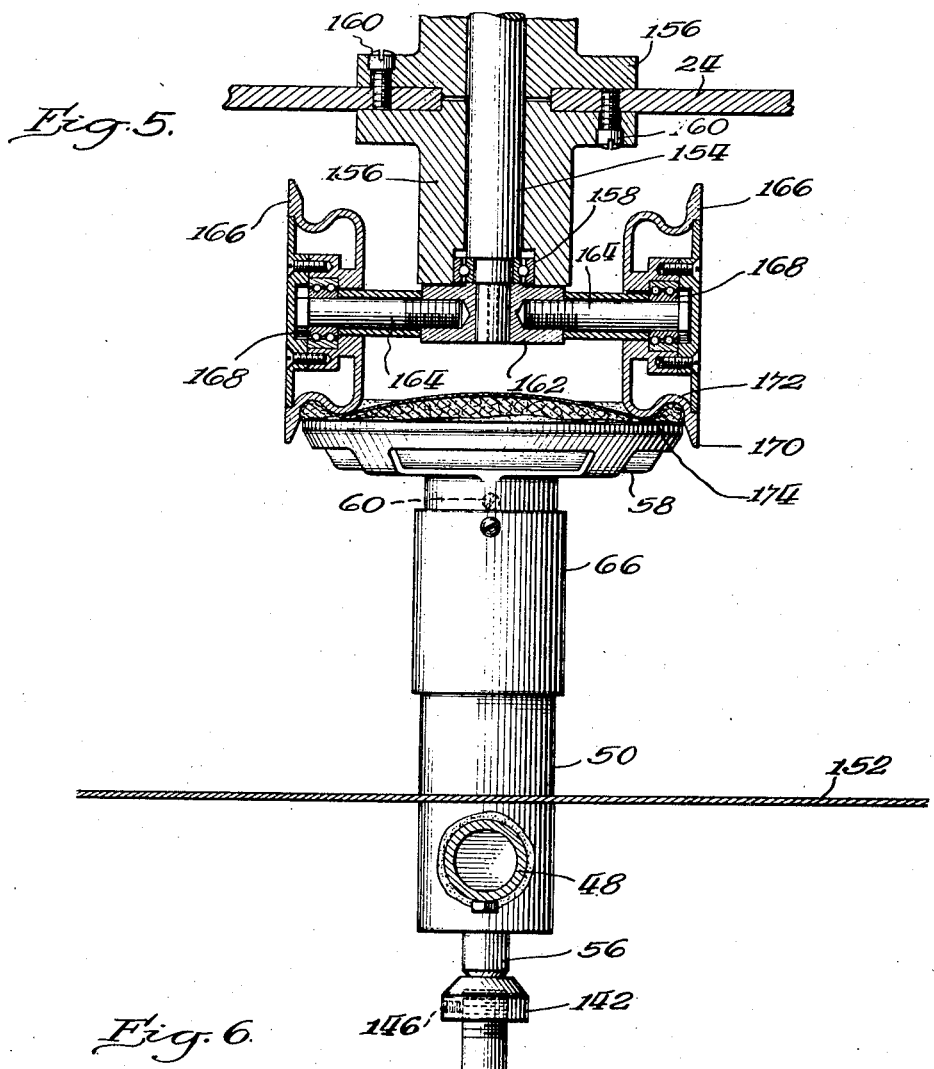
Fig. 5.
Fig. 6.
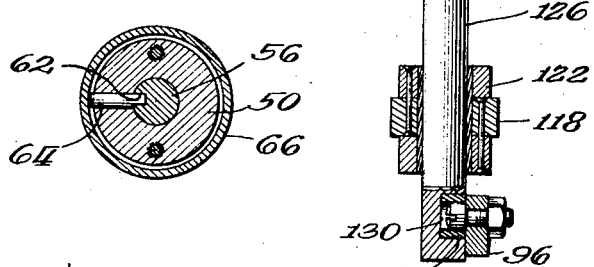
Inventors.
Lloyd J. Harriss
Bernard Lambers
By Williams, Bradbury,
McCaleb & Hinkle.
Attys.

Jan. 14, 1941.  L. J. HARRISS ET AL  2,228,516
PIE RIMMING MACHINE
Original Filed Sept. 17, 1938  10 Sheets-Sheet 6
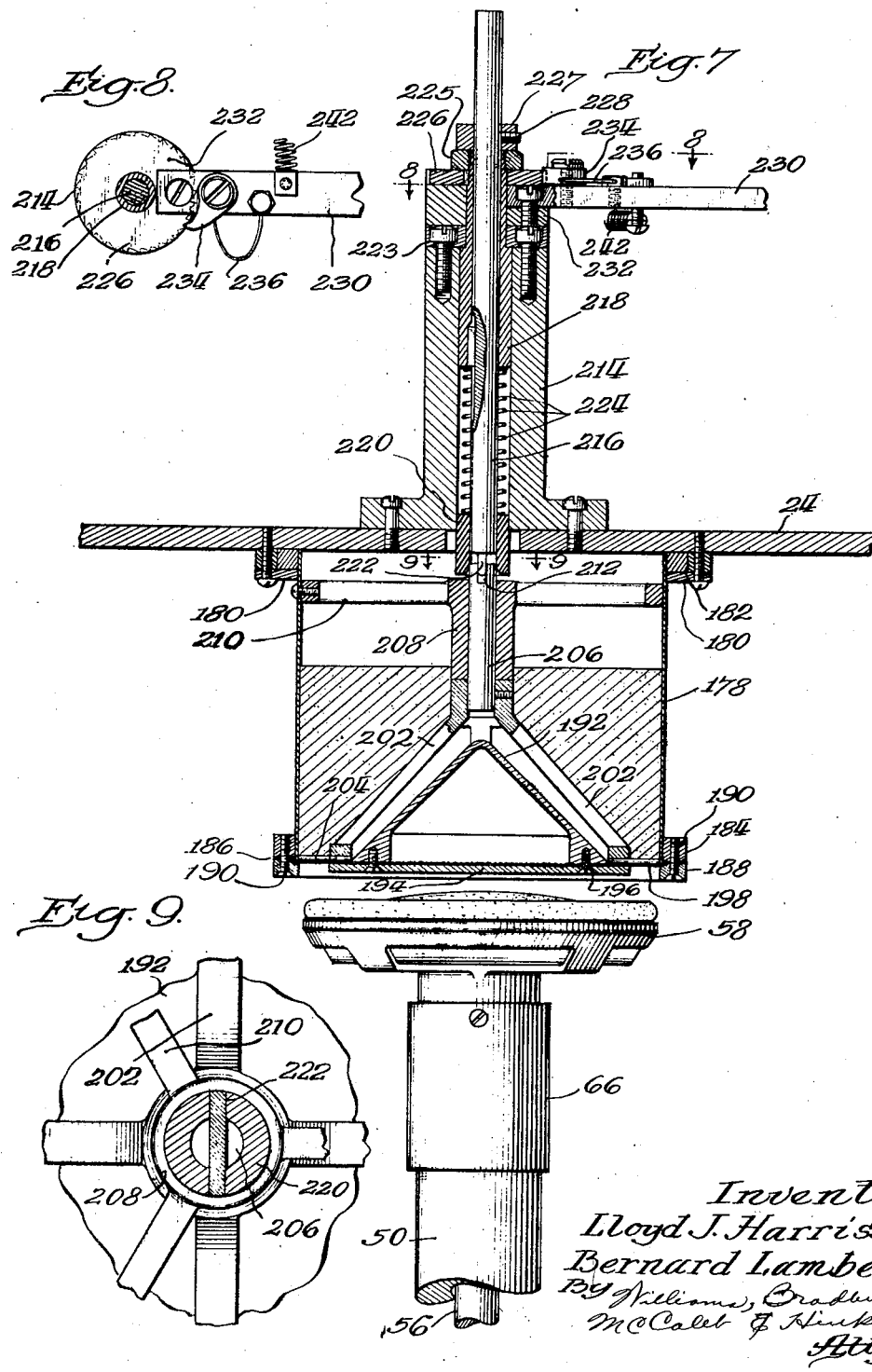

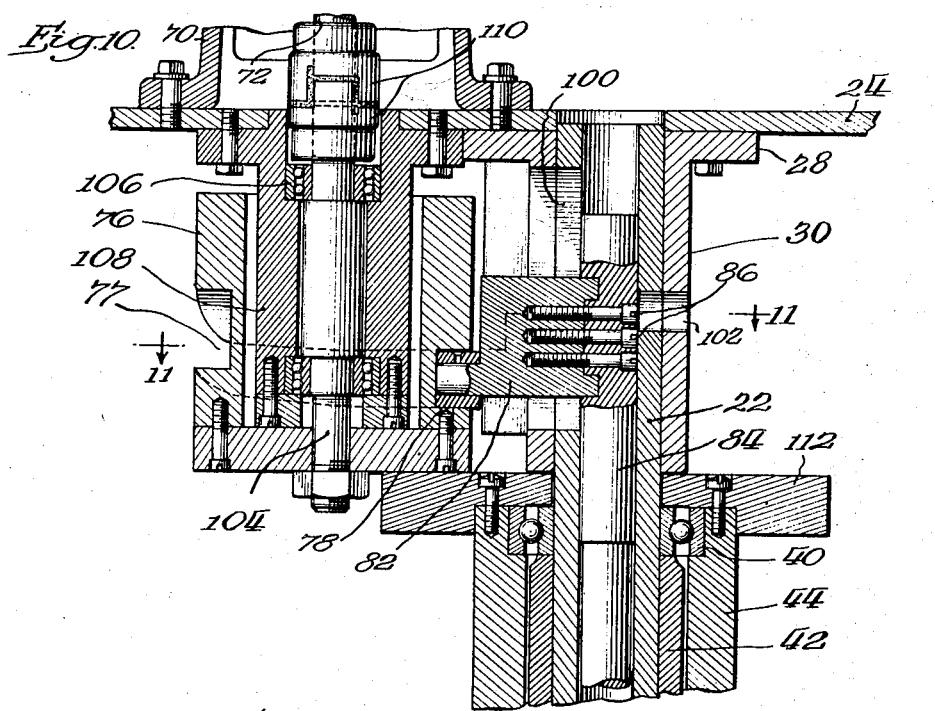
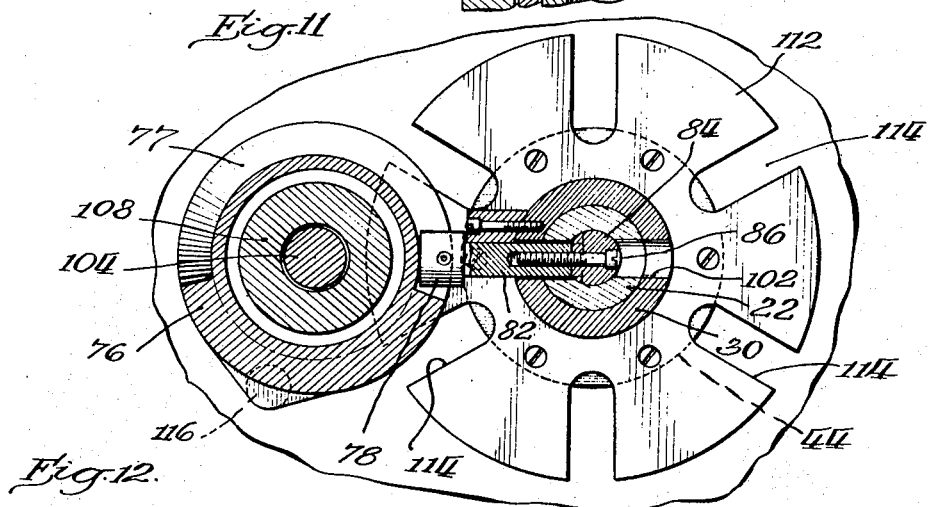
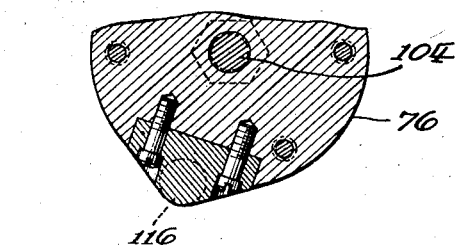

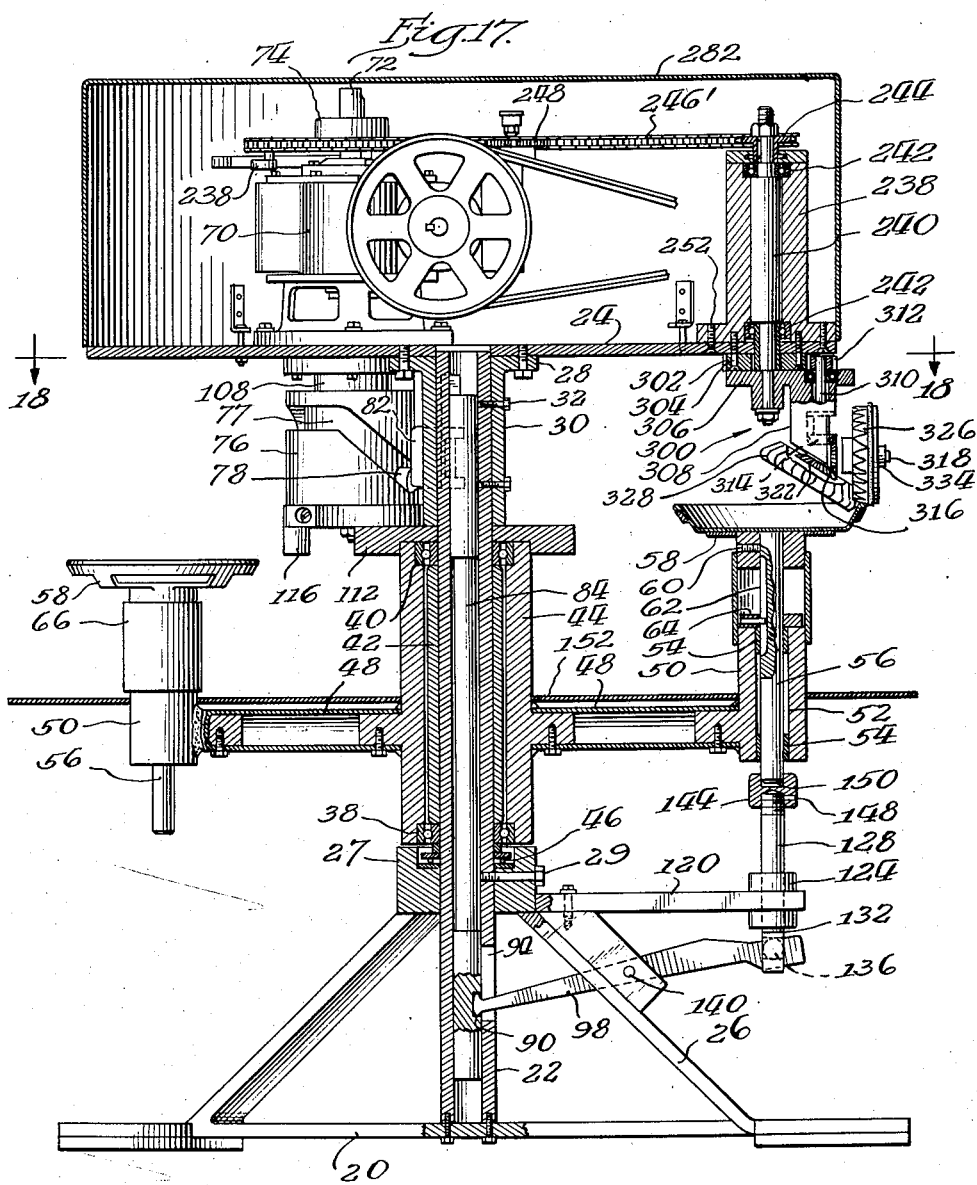

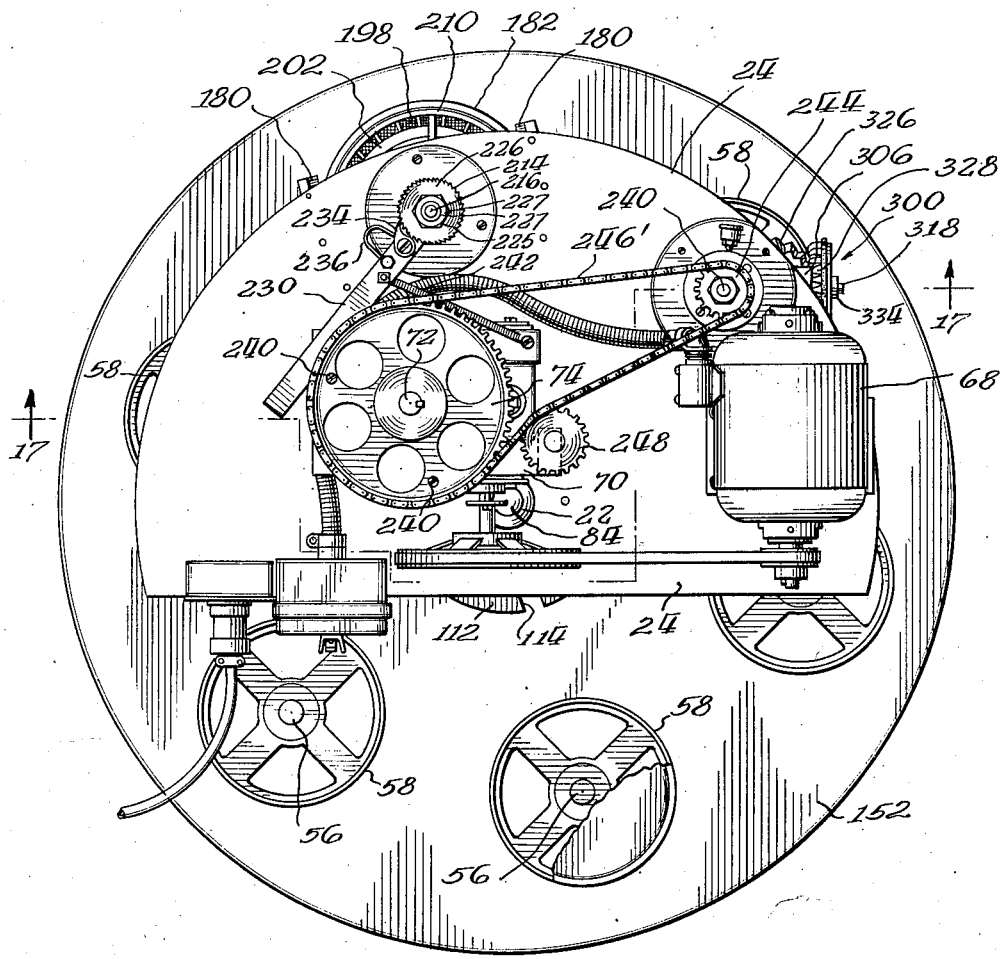

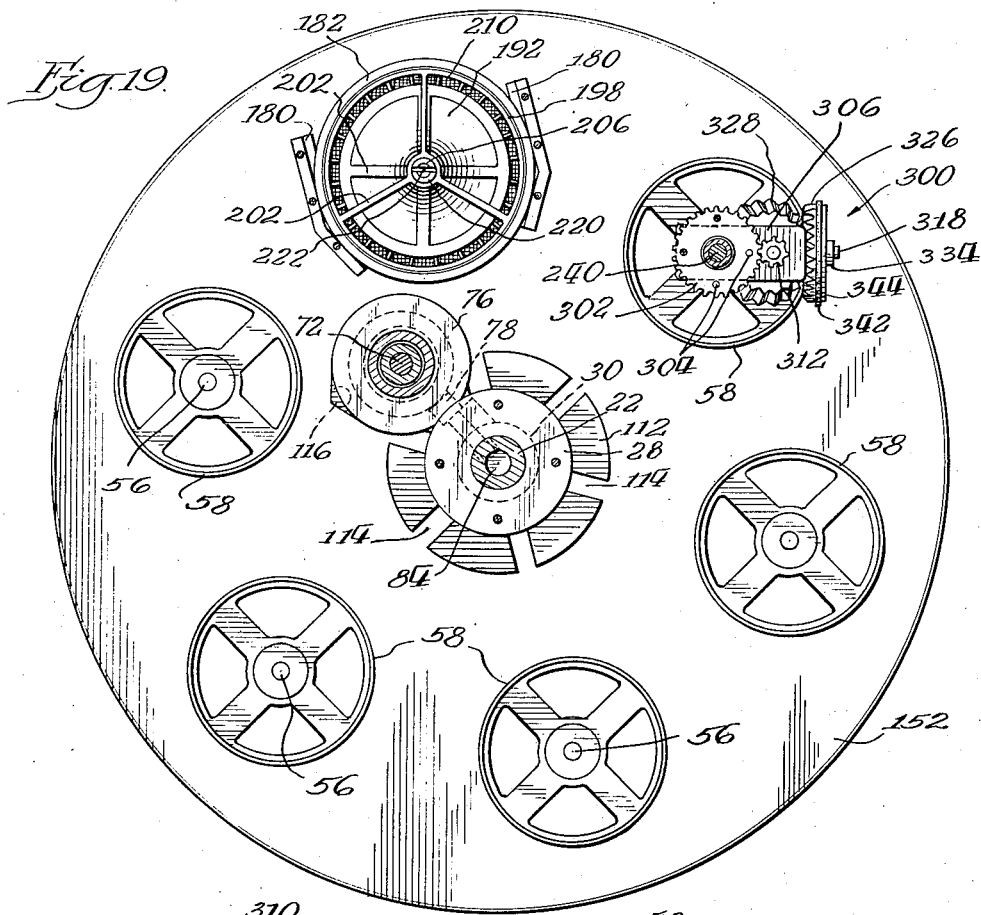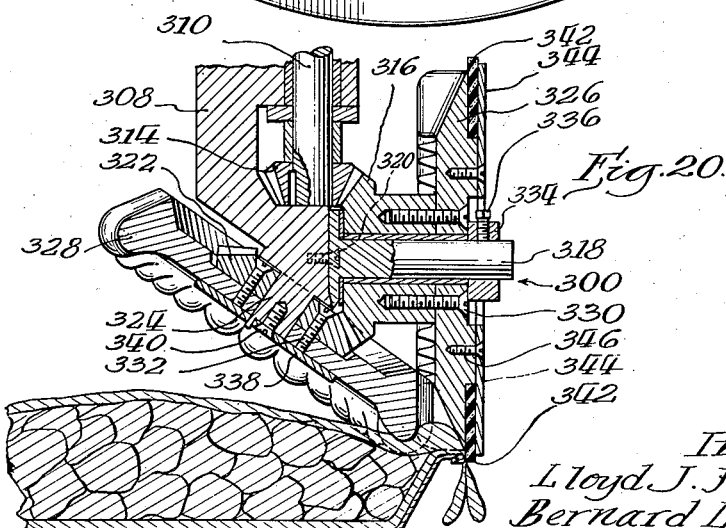

Patented Jan. 14, 1941

2,228,516

UNITED STATES PATENT OFFICE 2,228,516

PIE RIMMING MACHINE

Lloyd J. Harriss, Kenilworth, and Bernard Lambers, Oak Park, Ill.; said Lambers assignor to said Harriss Original application September 17, 1938, Serial No. 230,364. Divided and this application December 7, 1939, Serial No. 307,976

18 Claims. (Cl. 107—1)

This application is a division of our copending patent application entitled "Pie rimming machines," filed September 17, 1938, and given Serial No. 230,364, which matured Oct. 29, 1940, into Patent No. 2,219,448.

Our invention contemplates and provides a novel and advantageous machine for rimming pies, in which a pie that has been filled and provided with a top crust automatically has performed upon it the operations of dusting flour upon the edge of the pie and kneading the dough at the edge to provide the pie with a crimped or rippled periphery.

Although this machine may be used for rimming all types of pies, its method of operation is such that it is particularly adapted for rimming pie crusts having a much larger portion of shortening than is customarily used without danger of the crust becoming torn, even though such pie crusts are of a very fragile texture.

In the past, the amount of shortening which could be used in a pie crust dough has been limited by the fact that pie making machinery with which the art is acquainted puts considerable strain upon the unbaked pie crust, thus necessitating the use of a tough dough having a relatively low shortening content. Also, the stickiness of unbaked pie crust dough increases as the proportion of shortening is increased. This increases the difficulty of preventing dough having a large proportion of shortening from adhering to the dough working machinery.

It is, therefore, an important object of this invention to provide a novel machine for rimming pies which puts very little strain on the pie crust, and which has means adapted to prevent the dough from sticking to the dough working elements.

Another object of this invention is to provide a pie machine having a novel means for forming a crimped edge upon pies.

A further object of this invention is to provide a novel machine for trimming excess crust from the periphery of the pie, sifting flour around the edge of the pie, and finally kneading the edge of the pie to form a crimped periphery.

A further object of this invention is to provide improved means for holding a pie in proper relation to the operating machine elements.

Other objects and advantages will become apparent from a reading of the following description of a preferred embodiment of this invention.

In the drawings, in which like parts are designated by like numerals throughout the several views:

Fig. 2 is a vertical sectional view of the machine shown in Fig. 1, taken in the direction of the arrows along the line 2—2 of Fig. 1;

Fig. 3 is a horizontal sectional view taken in the direction of the arrows along the line 3—3 of Fig. 2;

Fig. 4 is a horizontal sectional view of the machine taken in the direction of the arrows along the line 4—4 of Fig. 2;

Fig. 5 is an enlarged detailed view of the crust trimming and bead forming head, shown associated with the pie carrying and lifting mechanism, illustrated partly in elevation and partly in section, with the plane of the section taken in the direction of the arrows along the line 5—5 of Fig. 1;

Fig. 6 is a horizontal sectional view taken in the direction of the arrows along the line 6—6 of Fig. 2;

Fig. 7 shows the interior structure of the flour sifting mechanism and is a vertical sectional view taken in the direction of the arrows along the line 7—7 of Fig. 1;

Fig. 8 is a horizontal sectional view taken in the direction of the arrows along the line 8—8 of Fig. 7 and shows in detail the pawl and ratchet step-off mechanism which actuates the flour sifter;

Fig. 9 is a horizontal sectional view taken in the direction of the arrows along the line 9—9 of Fig. 7;

Fig. 10 is a vertical sectional view taken in the direction of the arrows along the line 10—10 of Fig. 3;

Fig. 11 is a horizontal sectional view taken in the direction of the arrows along the line 11—11 of Fig. 10;

Fig. 12 is a horizontal sectional view taken in the direction of the arrows along the line 12—12 of Fig. 2;

Fig. 13 is a developed view of the crimping elements taken in the direction of the arrows along the line 13—13 of Fig. 2;

Fig. 14 is a horizontal sectional view taken in the direction of the arrows along the line 14—14 of Fig. 2;

Fig. 16 is a vertical sectional view taken in the direction of the arrows along the line 16—16 of Fig. 1;

Fig. 17 is a sectional view similar to Fig. 2, but showing an alternative embodiment of our machine;

Fig. 18 is a plan view similar to Fig. 1, but illustrating the alternative embodiment shown in section in Fig. 17;

Fig. 19 is a horizontal sectional view similar to Fig. 3, but illustrating the alternative embodiment shown in Figs. 17 and 18; and Fig. 20 is a vertical medial sectional view of the crimping mechanism used in the embodiment illustrated in Figs. 17 to 19.

Figure 1:
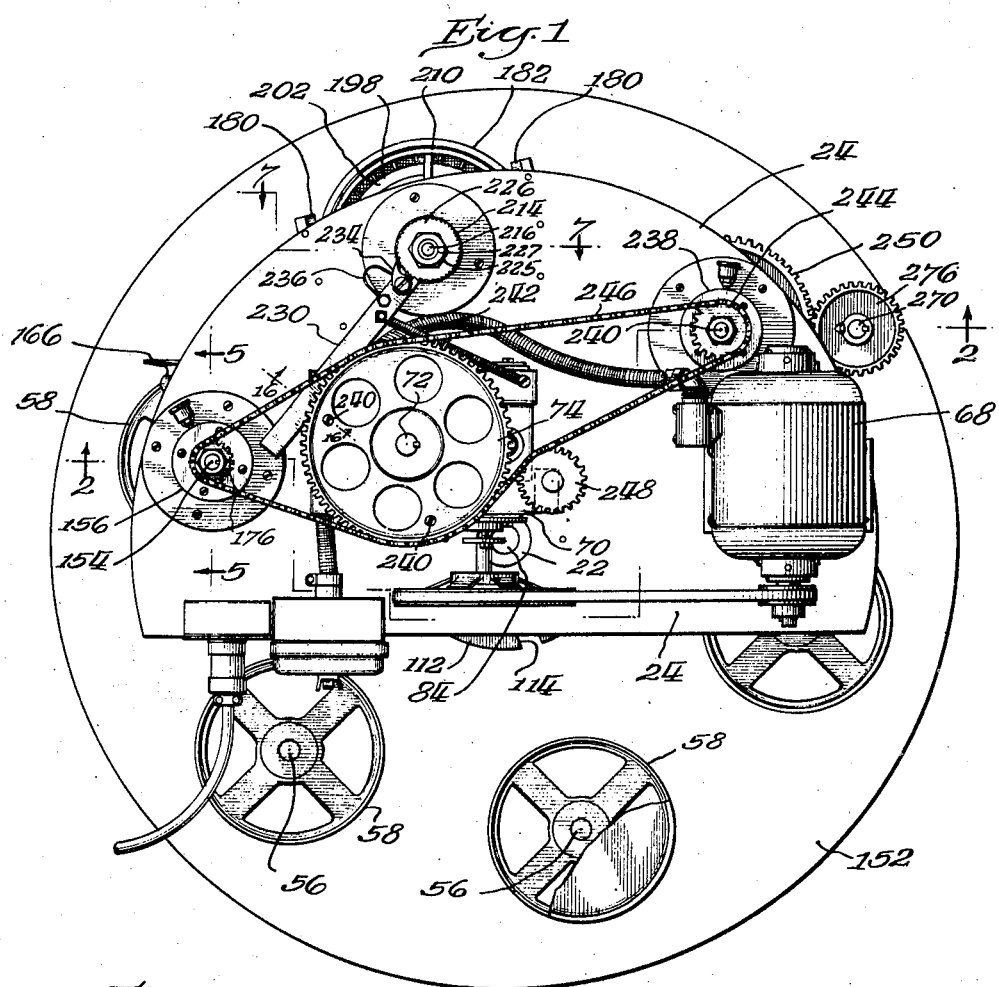
Fig. 1 is a plan view of a machine embodying our invention.

The frame of the machine comprises a base 20, an upright central tube 22 rising therefrom, and a flat semi-circular table 24 rigidly attached to the upper end of this tube. As shown, the base consists of four outwardly radiating legs, each of which is supplied with a diagonally upwardly extending brace 26 welded to a solid block 27 secured to the central tube 22 by means of bolts 29. By this construction, the central tube, the legs, and the bracing bars are secured into a rigid unit. The top plate 24 is securely bolted to a flange 28 at the upper end of a collar 30 which embraces the uppermost end of the tube 22, and is rigidly attached thereto by means of bolts 32.

The section of the tube 22 between the block 27 and the flanged collar 30 carries a pair of ball bearings 38 and 40 spaced apart by a tube 42. The outer races of these bearings 38 and 40 are seated in the ends of a cylinder 44, the lower end of which rests upon a ball thrust bearing 46 supported by the upper surface of the block 27. Thus, the cylinder 44 is freely rotatable about the shaft 22 on anti-friction bearings 38, 40 and 46.

The cylinder 44 at a point slightly below its mid-section is provided with six outwardly radiating arms 48 which are bolted, welded, or otherwise suitably secured thereto. The outward ends of these arms 48 are suitably secured to vertically disposed cylindrical columns 50. A hole 52 extends centrally through each of these columns 50 and is provided at each end with bushings 54, through which a central rod 56 slides freely. A pie carrying tray 58 is attached to the upper end of the rod 56 by means of a set screw 60, so that by raising and lowering the rod 56, the tray 58 may be raised and lowered therewith. To prevent rotation of the tray 58 with respect to the column 50, the shaft 56 is provided with a longitudinally extending kerf 62 into which the end of a pin or set screw 64, secured in the column 50, extends. To give the tray supporting column a finished appearance, a sleeve 66 is attached to the lower surface of the pie supporting tray 58 and moves upwardly and downwardly over the outer surface of the block 50 as the tray 58 is raised and lowered.

By means of the mechanism described above, it will be seen that the pie-holding tray 58 may be moved about a vertical axis formed by the tube 22, and that it may be raised and lowered by raising and lowering the rod 56.

As shown in Figs. 1 and 2, the plate 24 carries an electric motor 68 belted to a speed reduction gear box 70. This speed reduction gear box 70 may be of any suitable construction so that its output shaft 72 turns at a speed of approximately 10 R. P. M. It will be understood that other speeds may be used, but the speed given is proper for the embodiment illustrated which rims approximately 600 pies an hour.

The upper end of the shaft 72 is provided with a sprocket 74, the utility of which will be described presently.

Figure 15:
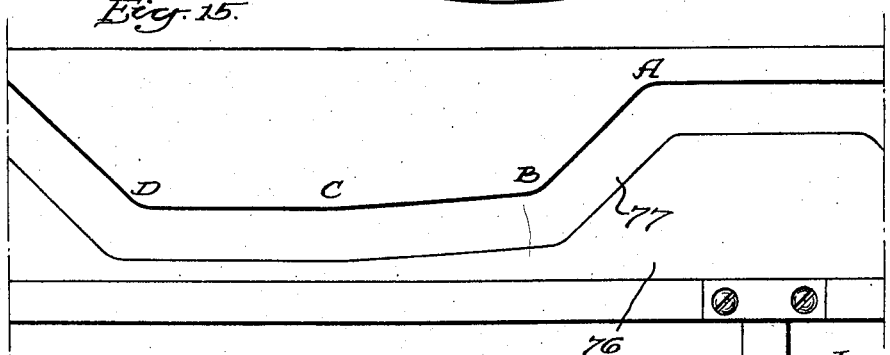
Fig. 15 is a developed view of the cam which operates the pie rack lifting mechanism.

The lower end of the shaft 72 extends through the table 24 and drives a drum cam 76 having a track 77 thereon. A developed view of this track is illustrated in Fig. 15. As shown in this developed view, as the track is moved along a following roller 78 until the roller reaches the point marked A, further advance of the cam quickly pushes the roller 78 downwardly to the point B, while still further advance of the cam causes a gradual further depression of the roller 78 until the roller reaches the point marked C. From this time forward, the roller is kept at a constant level until the cam track advances to the point D, whereupon the roller is raised to its initial level for another cycle.

The roller 78 is rotatably secured to a block 82, which in turn is rigidly attached to a reciprocating plunger 84, by means of three screws 86. The plunger 84 extends downwardly through the central stationary tube 22 and is provided at its lower end with a pair of slots 88 and 90. Opposite the slots 88 and 90, the tube 22 is cut away at 92 and 94, so that as the cam 76 revolves, thereby raising and lowering the central reciprocating rod 84, the slots 88 and 90 will be open to the outside at all points in the stroke to receive the inward ends of levers 96 and 98, the purpose of which will be indicated shortly.

To prevent rotation of the shaft 84 in the tube 22, a slot 100 in the tube 22 and flanged collar 30, through which the block 82 extends, is fitted to the sides of the block so that the block is free to reciprocate, but is restrained against movement from side to side. An opening 102 is provided in the tube 22 and collar 30 opposite the head of the screws 86, so that by moving the rod 84 upwardly and downwardly slightly, these screw heads 86 may be brought into register with this hole 102 to allow assembly or disassembly of the cam following mechanism.

Referring to Fig. 10 in which this cam 76 is shown in detail, it will be seen that it is secured to a central shaft 104 which is mounted on an anti-friction bearing 106 carried in a central pillar 108 secured the lower surface of the shelf 24. The upper end of this shaft 104, and the lower end of the downwardly extending shaft 72 leading from the speed reduction gear box are connected by means of a universal coupling 110. This structure enables a very rigid mounting for the cam 76, while at the same time preventing the possibility of binding if the parts are slightly misaligned.

The upper end of the revolving tube 44 carries a disc 112 provided with a plurality of equally radially spaced slots 114, in this instance 6, inasmuch as the machine is designed to carry 6 pies at a time. These slots 114 in conjunction with a downwardly extending roller 116, rotatably secured to the lower surface of the cam 76, form a step-off mechanism, so that with each revolution of the cam 76, the roller 116 will enter one of these slots 114 and step off the disc 112 one-sixth of a revolution. Although the mechanism thus described provides for stepping off the pie carrying trays one-sixth of a revolution around the machine for each revolution of the cam 76, it will be seen that this mechanism does not provide for locking the pie racks in the several positions as would a conventional Geneva mechanism. For reasons which will be appreciated later, we prefer to do this locking at a point remote from the center of the machine in a manner to be described.

The stationary block 27 carries two horizontal outwardly radiating arms 118 and 120 provided with bushings 122 and 124, respectively, at their outward ends to form the bearing members for vertically disposed rods 126 and 128, respectively. The radial distance of the rods 126 and 128 from the center of the machine is the same as that of the pie-tray supporting rods 76. The lower end of the rods 126 and 128 are rectangular and have horizontal slots 130 and 132 on their vertical surfaces, the horizontal edges of which engage the upper and lower surfaces of rollers 134 and 136, which are secured on a horizontal axis to the levers 96 and 98, respectively. The midpoints of these levers 96 and 98 are pivoted at 138 and 140, respectively, so that as the central rod 84 is moved upwardly and downwardly by the cam 76, these levers 96 and 98 will be rocked about their pivot points 138 and 140, thereby causing a raising and lowering of the shafts 126 and 128, respectively.

The upper ends of the shafts 126 and 128 carry lifting buttons 142 and 144, respectively, threaded thereon, so that by rotating these buttons they may be adjusted to different vertical positions on these shafts. When properly adjusted, the lifters are secured against movement on the shafts 126 and 128 by means of set screws 146 and 148. Although the upper surface of the lifter 142, which is positioned beneath the dough trimming rollers to be described presently, is flat, the lifter 144 beneath the crimping mechanism, also to be described later, is provided with a socket 150. Thus, when a pie is raised beneath the crimping mechanism, the socket 150 engages the lower end of the rod 56, thereby locking the pie-carrying mechanism against rotation until the pie is again lowered from beneath the crimping mechanism and the socket 150 disengaged from the shaft 56.

The reason that we prefer to lock the rotating pie-carrying mechanism at this particular point is that the crimping mechanism, in performing its operation, requires the most accurate location of the pie relative thereto, and this being true, it appears to be preferable to lock the machine at this point rather than at the center of the machine, or at some other one of the working stations.

It should be understood, of course, that the step-off disc 112 is so placed on the column 44 that as the mechanism is stepped off one-sixth of a revolution with each revolution of the cam 76, this step-off mechanism will properly locate the rod 56 with relation to the socket 150. In order to compensate for any slight inaccuracy in this relationship, the lower ends of the rods 56 are beveled in order to aid their seating in the socket 150.

To catch any pie crust that may fall from the pies during the rimming operations, a sheet metal table 152 may be provided just above the radiating arms 48. This table is provided with holes to fit around the posts 50, and around the central member 44, and rotates with the pie-carrying mechanism.

The pie crust trimming mechanism, which is situated directly above the position assumed by a pie when lifted by the rod 126, consists of a vertical spindle 154 extending through a pillar 156 and journaled at each end in anti-friction bearings 158. For convenience in assembly, the pillar 156 is made in an upper and a lower part, both of which are secured to the table 24 by means of screws 160. The lower end of the shaft 154 has a cross piece 162 secured thereto in any suitable manner, such as by a conventional set screw, not shown. Two oppositely extending horizontal shafts 164 are threaded into the cross piece 162, and at their outward ends carry freely rotating pie crust cutting wheels 166, mounted thereon by means of anti-friction bearings 168. The outer periphery of these wheels, as best shown in Fig. 5, is so shaped that as a pie is lifted beneath these cutters, while the shaft 154 is rotating, and outer lip 170 of the cutters 166 extends downwardly past the top surface of the pie plate and cuts away the excess pie crust extending beyond the outer edge thereof. From the lip 170 on the periphery of the wheel 166 the curvature extends upwardly towards the shaft 164 to a point 172, downwardly again toward the pie plate to a point 174, and then upwardly again in the form of an S curve. Thus, as the pie is raised beneath these rollers, and the lip 170 trims the pie crust from the edge of the tin, the portion 174 pushes the top pie crust directly therebeneath, downwardly somewhat, so that it will not interfere with the crimping mechanism which will be described presently, and simultaneously the upwardly curved portion 172 forms a bead of pie crust around the periphery of the pie. It is this raised bead which is formed into a crimped edge by the crimping mechanism. As seen in Figs. 1 and 2, the upper end of the shaft 154 carries a sprocket 176 for the purpose of driving the shaft.

The flour sifting mechanism comprises a container 178, which may be made of sheet metal or any other suitable material, secured in proper location beneath the table 24 by means of slide rails 180 attached thereto between which an annular flange 182 attached to the upper end of the container 178 is slid. The lower end of the container 178 also has a similar flange 184. The bottom of the container 178 is covered by a fine wire mesh 186 clamped against the flange 184 by means of a ring 188 secured to the flange by a plurality of screws 190 substantially equally spaced around the circumference. The upper surface of the mesh 186 supports a conical member 192 attached thereto by means of a circular plate 194 placed beneath the mesh and secured to the conical structure by screws 196, thereby leaving only a narrow annular ring 198 of the wire mesh uncovered.

An agitator 202 extends obliquely downwardly and rests upon the wire mesh 198. A plurality of substantially equally spaced pins 204 extend radially from the lower extremity of the agitator 202 and are positioned across the exposed portion of the mesh 198 to serve as agitating bars. These bars agitate the flour and cause a portion of it to fall through the wire mesh on to the periphery of the pie when the agitator 202 is rotated.

The agitator 202 is driven by a shaft 206 attached thereto and extending upwardly through a journal 208 supported from the sides of the container 178 on a spider 210. The upper end of the shaft 206 lies slightly below the table 24 and has a kerf 212 extending across the end thereof. A pillar 214 is attached to the upper surface of the table 24 and has a shaft 216 extending therethrough keyed to a bushing 218. The lower end of the shaft 216 is provided with a collar 220 adapted to fit over the end of the shaft 206. A key 222 extends across the lower end of the shaft 216 and serves to engage the kerf 212. The bushing 218 rotates within the pillar 214 and is secured therein by a collar 223. The upper end of this bushing is of reduced diameter and extends through the collar 223 and is threaded to a collar 225 which secures in place a ratchet wheel to be described.

Surrounding the shaft 216 and extending between the upper surface of the sleeve 220 and the lower surface of the bushing 218 is positioned a spring 224 which tends to urge the shaft 216 downwardly. By means of this construction, the shaft 216 can be grasped at its top and lifted against the pressure of the spring 224, thereby disengaging the key 222 from the kerf 212 and enabling the container 178 and the agitating mechanism therein to be withdrawn from the slide 180, so that it may be cleaned or refilled. After cleaning and filling, the container can be slid back into position and the rod 216 lowered, thereby engaging the key 222 in the kerf 212 so that the agitating mechanism may be driven by the shaft 216. In this position the shaft 216 is supported by a collar 227 at its top secured thereto by a set screw 228. A ratchet wheel 226, previously mentioned, is keyed to the bushing 218 and serves as a step-off mechanism to rotate the bushing 218 and the agitator 202. A lever 230 is swiveled at the top of the pillar 214 on a collar 232 and carries a pawl 234 urged into engagement with the ratchet wheel 226 by a spring 236.

Two cams 238, best seen in Figs. 2 and 16, are attached to the lower surface of the sprocket 74 by screws 240. The outer end of the lever 230 extends beneath the sprocket 74 and is urged into contact with the cams 238 by a coil spring 242, so that as the sprocket 74 revolves, it will twice during each revolution cause one of the cams 238 to be brought into contact with the lever 230 and cause the lever to be oscillated to the left, as seen in Fig. 1. A stop, not shown, beneath the sprocket 74 limits the inward motion of the lever 230 under the influence of the spring 242. The cams 238, as shown in Fig. 16, are supported in an off-center position, so that the amount of throw given the lever 230 as the cam moves past the lever may be adjusted by clamping the cams against the sprocket 74 in different positions. The cams 238 should be so located on the sprocket 74 that they will cause two oscillations of the lever 230 in the time interval during which each of the pies is held stationarily beneath the flour sifter.

We prefer to use two cams, each of which rotates the agitator slightly, rather than one larger cam, since the amount of flour thus deposited seems to be more easily controllable and the mechanism more positive in its operation. It will be appreciated, however, that under some circumstances only one cam, or more than two cams could be used.

The next revolution of the step-off mechanism 112 brings the pie on which the flour has been sifted to a position beneath the crimping mechanism, the axis of rotation of which is coaxial with the pie lifter 144.

As best seen in Fig. 2, the pie crimping mechanism comprises a vertical column 238 mounted upon the table 24 and has a vertical shaft 240 extending therethrough journaled at each end upon anti-friction bearings 242. The top of the shaft 240 carries a sprocket 244 by means of which the mechanism is driven.

To drive the crimping mechanism as well as the pie crust trimmer a continuous chain 246 is linked around the sprockets 244, 176, the driving sprocket 74, and an idling sprocket 248, which is adjustably mounted upon the table 24 in a manner well known and serves to adjust the slack in the chain 246. Thus, as the sprocket 74 is revolved by the motor 68, it will drive both the pie crust cutting mechanism and the crimping mechanism. The relative sizes of the three sprockets 74, 176, and 244 are adjusted so that as the sprocket 74 revolves at a speed of approximately 10 R. P. M., the sprocket 176 revolves at a speed of approximately 60 R. P. M., while sprocket 244 revolves at about 40 R. P. M. It will be understood that these relative speeds are not critical, and that wide variations may be made therefrom without impairing the efficiency of the machine. However, having been found satisfactory in service, these relative speeds are given for purposes of illustration.

The shaft 240 extends through the table 24 and through the center of a sun gear 250, rigidly secured to the under side of the table 24 in any suitable manner. For instance, as shown, the gear may be drilled and tapped, thereby using the same bolts 252 to secure both the pillar 238 and the gear 250 to the table 24, as best shown in Fig. 2.

The lower end of the shaft 240 is secured to a generally horizontally disposed arm 254 by means of a nut 256 and key 258. One end of the shaft 254 projects horizontally and at its outward end carries a vertically disposed shaft 260, the lower end of which has secured thereto a horizontally disposed roller 262 mounted for free rotation thereon by means of anti-friction bearings 264. This roller 262 is designed to be in contact with the outer periphery of the pie plate as the shaft 260 is moved in a circle about the axis of the shaft 240. The purpose of this roller is to prevent the crimping mechanism, which will be described shortly, from pushing the pie tin sideways out of the pie tin carrying rack 58.

The opposite end of the shaft 254 from that just mentioned extends obliquely downwardly and is secured to, or may be made integrally with, a gear case 266. This gear case 266 contains two shafts 268 and 270 journaled therein on anti-friction bearings. These two shafts are mounted obliquely to each other at an acute angle, and near the top of the gear case 266 these shafts carry meshed pinions 272 and 274, respectively, so that the two shafts will revolve together when either is turned. The shaft 270, which is the farther removed of the two from the shaft 240, extends vertically through the gear case and carries at its topmost end a planet gear 276 which meshes with the sun gear 250. Thus, as the shaft 240 revolves and swings the gear casing 266 around its axis of rotation, the planet gear 276 will run around the sun gear 250, and cause the two shafts 268 and 270 to revolve on their respective axes.

The lower end of the shafts 268 and 270 carry meshed crimping members 278 and 280, respectively. The configuration of the crimpers used in this embodiment is shown in Fig. 13, although it will be understood that wide variations from the design shown can be made, depending upon the form of the crimp it is desired to use.

In order to prevent the pie crust from being torn by these crimpers, the gear 250 has a pitch diameter substantially equal to the diameter of the pie, while the pitch diameter of the gear 276 is equal to the pitch diameter of the crimping element 280. By arranging the gear sizes thus, the crimping members may be permitted to run around the periphery of the pie more than once without disturbing the crimp formed in the pie crust on the first circuit.

To prevent dirt from entering the mechanism above the table 24 and to give the machine a neat appearance, a hood 282 of sheet metal or other suitable material may be placed over this portion of the apparatus as shown in Fig. 2.

In operation, the operator removes the crimped pies and replaces them by pies to be operated upon at any one or more of the three exposed stations of the machine. The pies to be operated upon then move beneath the trimming and bead-forming station where the rollers 166 revolving around the spindle 154' shape the pie crust to form a bead and trim the surplus from the edge of the pie tin as previously described when the cam 76 and its associated mechanism lifts the pie upwardly beneath these rollers. After the pie is lowered, the roller 116 steps off the pie carrying mechanism one-sixth of a revolution, thus bringing the pie being operated upon beneath the flour sifting mechanism at the next station. While beneath this station the two cams 238 on the sprocket 74 reciprocate the lever 230 and deposit a small amount of flour around the periphery of the pie on the bead previously formed. The next rotation of the cam 76 brings the pie beneath the crimping station where the cam 76 and its associated mechanism raise the lifter 144. This lifter engages the shaft 56 thereby locking the table against rotation, and lifts the pie into engagement with the crimping elements 278 and 280. The pie is held in this lifted position for a short interval of time during which the crimping elements are run around the periphery of the pie and form the crimp in the bead previously formed in the manner described in connection with the description of the crimping mechanism. On further revolution of the cam 76, the pie is lowered and the table stepped off another sixth of a revolution, thus, bringing the pie to a position where the operator can remove it from the pie rack and replace it with another pie to be operated upon.

Ordinarily as pies come to the crimping machine they will have enough flour on the top crust to prevent the trimming and bead forming rollers from sticking. After this trimming operation, however, the flour originally on the pie will have been kneaded into the crust, thus making it advisable to provide the flour sifter shown. If previous operations do not leave enough flour on the pie to prevent its sticking to the cutting and bead forming rollers, it is advisable to use two flour sifters, one before each of the kneading stations. In ordinary use, however, we believe that the one shown and described will be sufficient.

Under certain conditions enough flour might be placed upon the pie before the pie arrives at the first working station to prevent the crust from sticking to either the bead forming or the crimping mechanism. This would obviate the necessity of the flour sifter in the position shown and described in the preferred embodiment.

It will be understood that another expedient for preventing sticking would be to blow the flour onto the working elements rather than applying it to the pie crust, although we prefer to accomplish the result sought in the manner illustrated and described, since it does not have the disadvantage of making it difficult to prevent the scattering of flour around the room.

In the alternative embodiment of our invention illustrated in Figs. 17 to 20, the machine is provided at the crimping station with mechanism differing somewhat from that illustrated in the previously described embodiment. By the substitution of this alternative crimping head, the separate bead forming and dough trimming station may be dispensed with. The machine illustrated in Figs. 17 to 20, therefore, is similar to the previously described machine, with the exceptions that the crimping heads are different and the machine shown in Figs. 17 to 20 lacks the bead forming mechanism and tray lifting mechanism positioned beneath this bead forming mechanism.

For convenience in referring to the figures illustrating these two embodiments, like elements in the two machines are indicated by like numerals, and where no difference exists between the two machines, the description is not repeated.

Since the bead forming mechanism is absent from this alternative embodiment, it will be seen that the drive chain 246' is shorter than the similar chain 246 in the previously described embodiment.

In the embodiment illustrated in Figs. 17 to 20, the combined trimming and crimping head, indicated generally by the numeral 300, consists of the rotatable vertical spindle 240 journaled in anti-friction bearings 242 at each end of the pillar 238. This pillar 238 is secured to the top surface of the platform 24 in such a position that the spindle 240 is axially aligned with a pie on whichever one of the pie carrying racks 58 is in position to be raised by the lifting element 150. The top end of the spindle 240 carries a sprocket 244 keyed thereto and driven by the chain 246'. Thus, this spindle 240 is in continuous rotation whenever the machine is in operation.

The spindle 240 extends through the table 24 and through the center of a sun gear 302, rigidly secured to the under side of the table 24 in any suitable manner, such, for instance, as by the same screws 304 that secure the pillar 238 to the upper surface of the table.

The lower end of the spindle 240 is secured to the horizontal leg of a generally L-shaped swinging arm 306. A downwardly extending leg 308 of this arm carries a vertical shaft 310 journaled therein and provided at its upper end with a planet pinion 312 meshed with the sun gear 302. This arrangement is, in general, similar to that of the previous embodiment, but it should be noted that the shaft 310, as it is swung around on the arm 306, describes a circle considerably smaller than that formed by the edge of the pie plate, whereas the shaft 270 extends downwardly outside the periphery of the pie plate.

The lower end of the shaft 310 is provided with a beveled pinion 314 meshed with a beveled gear 316 mounted for free rotation upon a horizontal stub shaft 318. For convenience in manufacturing the crimping head, the stub shaft 318 is shown formed as a separate piece secured to the arm by screws 320. It will be understood, however, that, if desired, this stub shaft can be formed as a unitary portion of the arm.

The beveled gear 316 meshes in turn with a similar gear 322 mounted for free rotation upon an obliquely downwardly projecting stub shaft 324 formed as part of the vertical leg 308 of the arm 306. Both of the gears 316 and 322 are secured to meshed crimping elements 326 and 328, respectively, by means of screws 330 and 332. The gear and crimper elements are prevented from sliding axially on the stub shafts by a collar 334 secured on the outward end of the stub shaft 318 by a set screw 336, and a washer 338 held against the end of the stub shaft 324 by a screw 340.

When the vertical spindle 240 is rotated, the crimping elements 328 and 326 will run around the edge of the pie supported upon the rack 58, much in the manner as explained in the previously described embodiment. The crimping element 326, however, is provided at its outer face with a rubber ring 342 held in place by a plate 344 secured against the outward face of the crimper 326 by screws 346. This rubber ring 342 extends beyond the edge of the crimper 326 and rubs against the edge of the pie plate, as shown best in Fig. 20. The shearing action of the rubber ring 342 rubbing against the edge of the pie plate serves to cut off whatever excess pie crust dough is squeezed outwardly from between the meshed crimping elements 328 and 326. The reason that we prefer to make the ring 342 of rubber, or some other resilient material is that it better adapts itself to working against the edges of pie plates which may become nicked or slightly bent. This ring also serves to take the sidewise thrust the crimping elements exert against the pie, and it thus effectively replaces the roller 262 shown in the earlier described embodiment.

Although we have shown preferred embodiments of our invention, it will be understood that variations can be made therefrom, while still incorporating the novel features herein disclosed. It will be understood, therefore, that the scope of this invention is to be determined by an inspection of the following claims.

What we claim as new and useful and desire to secure by Letters Patent of the United States is:

1. In a machine for rimming pies, a crimping head comprising meshed crimping elements, means to revolve said crimping elements in opposite directions, means to move the intermeshed portion of said crimping elements around the periphery of a pie, the diameter of said crimping elements being sufficiently small so that neither of the elements touches the pie excepting at substantially the intermeshed portion.

2. In a device of the class described, a crimping head, a movable conveyor to carry pies beneath said crimping head, a lifting arm to lift a pie on said conveyor into engagement with said crimping head, said lifting arm also adapted to lock said conveyor against movement while the pie is in engagement with the crimping head.

3. In a pie rimming machine, mechanism for crimping the edge of a pie, said mechanism comprising meshed crimping elements, means to move the intermeshed portion of said elements around the periphery of a pie, meshed pinions to drive said crimpers in opposite directions, said crimpers rotating on a shaft coaxial with said pie, a stationary sun gear surrounding said shaft, a planetary gear meshed with said sun gear, and means to connect said planetary gear with one of said crimping elements.

4. In a pie rimming machine, mechanism for crimping the edge of a pie, said mechanism comprising meshed crimping elements, means to move the intermeshed portion of said elements around the periphery of a pie, meshed pinions to drive said crimpers in opposite directions, said crimpers rotating on a shaft coaxial with said pie, a stationary sun gear surrounding said shaft, a planetary gear meshed with said sun gear, and means to connect said planetary gear with one of said crimping elements, the pitch diameters of the sun gear and the planetary gear being substantially equal to the diameter of the pie and the pitch diameter of the last said crimping element respectively.

5. In a device of the class described having a crimping head and a movable conveyor to carry pies in succession beneath the crimping head, vertically movable pie supporting rods on said conveyor and elevating means to lift said rods to bring pies thereon into engagement with the crimping head, said elevating means telescoping said rods, thereby serving accurately to center the pie supporting rods relative to said crimping means and to lock said conveyor against movement.

6. In a machine for rimming pies having a top crust thereon, a crimping head comprising inner and outer crimping elements, said elements being intermeshed, means to revolve said elements in opposite directions, means to swing said elements in a circle concentric with a pie supported thereunder so that the intermeshed portion of said elements travels around the periphery of a pie to form a crimped edge thereon, and said inner crimping element being disposed in a plane oblique to the plane of the pie.

7. In a machine for rimming pies, a pie support, a crimping head comprising inner and outer crimping elements, said elements being intermeshed, means to revolve said elements in opposite directions, means to swing said elements in a circle concentric with the pie support, and means to raise the pie support to bring a pie thereon into engagement with the crimping elements so that the intermeshed portion of said elements travels around the periphery of a pie to form a crimped edge thereon.

8. In a machine for rimming pies having a top crust thereon, a pie support, a crimping head comprising inner and outer crimping elements, said elements being intermeshed to form a crimping portion, means to revolve said elements in opposite directions, rotating means to swing said elements in a circle concentric with the pie support, lifting means to raise the pie support to bring a pie thereon into engagement with the crimping elements, and the inner crimping element being disposed above the top surface of a pie on said support excepting at the crimping portion, so that the intermeshed portion of said elements travels around the periphery of a pie to form a crimped edge thereon without indenting the top pie crust excepting at the periphery thereof.

9. In a machine for rimming pies, a crimping head comprising inner and outer crimping elements, said elements being intermeshed, means to revolve said elements in opposite directions, means to swing said elements in a circle concentric with a pie supported thereunder so that the intermeshed portion of said elements travels around the periphery of a pie to form a crimped edge thereon, and the diameter of said inner crimping element being substantially less than the diameter of a pie it is adapted to crimp.

10. In a machine for rimming pies, a pie support, a crimping head comprising inner and outer crimping elements, said elements being intermeshed, means to revolve said elements in opposite directions, means to swing said elements in a circle concentric with a pie supported thereunder so that the intermeshed portion of said elements travels around the periphery of a pie to form a crimped edge thereon, and holding means to prevent the crimping elements from causing relative movement between the pie support and a pie being crimped thereon.

11. In a machine for rimming pies, a pie support, a crimping head comprising inner and outer crimping elements, said elements being intermeshed to form a crimping portion, means to revolve said elements in opposite directions, rotating means to swing said elements in a circle concentric with the pie support so that the intermeshed portion of said elements travels around the periphery of a pie to form a crimped edge thereon, and lifting means to raise and lower the pie support to bring a pie thereon into and out of engagement with the crimping elements while the crimping elements are in motion to aid in preventing pie crust from sticking to the said elements.

12. In a machine for rimming pies, a crimping head comprising inner and outer crimping elements, said elements being intermeshed, means to revolve said elements in opposite directions, and means to swing said elements in a circle concentric with a pie supported therebeneath so that the intermeshed portion of said elements travels around the periphery of a pie to form a crimped edge thereon.

13. In a pie rimming machine having a conveyor adapted to carry a plurality of pies successively beneath bead forming, dusting and crimping stations, the combination comprising, a rotatable cam, lifting elements to elevate pies on the conveyor into contact with certain of the stations, one of said lifting elements adapted to lock the conveyor against movement when the last said lifter maintains a pie in elevated position, said cam adapted once each revolution to advance said conveyor and to actuate said lifters.

14. In a machine for rimming pies, a vertical rotatable spindle, an arm secured to the spindle and adapted to rotate therewith, a crimping head comprising meshed crimping elements secured to said arm eccentric to the spindle, the rotating of said spindle adapted to swing said head in a circle and to rotate said crimping elements in opposite directions.

15. In a pie rimming machine, mechanism for crimping the edge of a pie, said mechanism comprising meshed crimping elements, means to move the intermeshed portion of said crimping elements around the periphery of a pie, meshed pinions to drive said crimping elements in opposite directions, said crimping elements rotating on a shaft coaxial with said pie, a stationary sun gear surrounding said shaft, a planetary gear meshed with said sun gear, means to connect said planetary gear with one of said crimping elements, and a dough cutting element secured to one of said crimping elements and adapted to rub against the edge of a pie plate with a shearing action as said crimping elements move around the pie.

16. In a pie rimming machine, a pair of meshed crimping elements, means to rotate said crimping elements in opposite directions, means to pass the edge of a pie through the meshed portion of said crimping elements to crimp the edge of said pie, and a member on one of said crimping elements to shear excess pie crust from the edge of the pie simultaneously with the crimping operation.

17. In a pie rimming machine, a pair of meshed crimping elements, means to rotate said crimping elements in opposite directions, means to pass the edge of a pie through the meshed portion of said crimping elements, one of said crimping elements revolving in a plane oblique to the plane of the pie and the other of said crimping elements revolving in a plane substantially normal to the plane of the pie.

18. In a machine for rimming pies, a crimping head comprising meshed crimping elements, means for revolving said crimping elements in opposite directions, means for moving the intermeshed part of said crimping elements on a radius corresponding to the radius of a pie, said crimping elements being of relatively small diameter, in order that a minimum amount of said elements may come in contact with said pie.

LLOYD J. HARRISS.
BERNARD LAMBERS.